(12) United States Patent
Takahashi et al.

(10) Patent No.: US 12,051,550 B2
(45) Date of Patent: Jul. 30, 2024

(54) ELECTRONIC COMPONENT, PRODUCTION METHOD FOR ELECTRONIC COMPONENT, MANAGEMENT METHOD FOR ELECTRONIC COMPONENT, AND PROGRAM

(71) Applicant: Panasonic Intellectual Property Management Co., Ltd., Osaka (JP)

(72) Inventors: Seita Takahashi, Yamaguchi (JP); Tomoyuki Ishikawa, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 997 days.

(21) Appl. No.: 16/978,755

(22) PCT Filed: Mar. 26, 2019

(86) PCT No.: PCT/JP2019/012821
§ 371 (c)(1),
(2) Date: Sep. 7, 2020

(87) PCT Pub. No.: WO2019/189159
PCT Pub. Date: Oct. 3, 2019

(65) Prior Publication Data
US 2020/0409338 A1 Dec. 31, 2020

(30) Foreign Application Priority Data
Mar. 29, 2018 (JP) .................................. 2018-063910

(51) Int. Cl.
*H01G 9/00* (2006.01)
*G06K 19/06* (2006.01)
(Continued)

(52) U.S. Cl.
CPC ........... *H01G 9/0029* (2013.01); *G06K 19/06* (2013.01); *H01G 2/24* (2013.01); *H01G 9/08* (2013.01)

(58) Field of Classification Search
CPC .......... H01G 9/0029; H01G 2/24; H01G 9/08; G06K 19/06
(Continued)

(56) References Cited

U.S. PATENT DOCUMENTS

2014/0258165 A1* 9/2014 Heil ................... G06Q 10/0833
235/494
2018/0096775 A1 4/2018 Shibuya et al.

FOREIGN PATENT DOCUMENTS

JP 2-010712 1/1990
JP 6-196369 7/1994
(Continued)

OTHER PUBLICATIONS

Communication pursuant to Rule 164(1) EPC dated May 6, 2021 for the related European Patent Application No. 19775169.6.
(Continued)

*Primary Examiner* — Arun Ramaswamy
(74) *Attorney, Agent, or Firm* — Rimon P.C.

(57) ABSTRACT

An electronic component (for example, an electrolytic capacitor) includes an internal element (for example, a capacitor element) and a packaging (for example, a case). The production lot for the internal element includes a plurality of subunits. The packaging is provided with an identifier for identifying the plurality of subunits. By this configuration, it is possible to provide an electronic component capable of specifying production information, a production method for the electronic component, a management method for the electronic component, and a program. The identifier may be provided on the packaging as a (Continued)

display. Further, the identifier may be a one-dimensional code or a two-dimensional code.

7 Claims, 6 Drawing Sheets

(51) Int. Cl.
*H01G 2/24* (2006.01)
*H01G 9/08* (2006.01)

(58) Field of Classification Search
USPC .................................. 361/271; 235/375, 494
See application file for complete search history.

(56) References Cited

FOREIGN PATENT DOCUMENTS

| | | | |
|---|---|---|---|
| JP | 2000-156331 A | 6/2000 | |
| JP | 2001-006976 | 1/2001 | |
| JP | 2003-207533 A | 7/2003 | |
| JP | 2004-158475 A | 6/2004 | |
| JP | 2008078541 A * | 4/2008 | ............... H01G 2/24 |
| JP | 2011-210663 | 10/2011 | |
| JP | 2018-056475 | 4/2018 | |
| KR | 10-1251990 B1 | 4/2013 | |
| KR | 2013061556 A * | 6/2013 | |

OTHER PUBLICATIONS

The Extended European Search Report dated Aug. 9, 2021 for the related European Patent Application No. 19775169.6.
International Search Report of PCT application No. PCT/JP2019/012821 dated Jun. 11, 2019.

* cited by examiner

ELECTRONIC COMPONENT, PRODUCTION METHOD FOR ELECTRONIC COMPONENT, MANAGEMENT METHOD FOR ELECTRONIC COMPONENT, AND PROGRAM

TECHNICAL FIELD

The present disclosure generally relates to an electronic component, a production method for the electronic component, a management method for the electronic component, and a program. More specifically, the present disclosure relates to an electronic component having a packaging, a production method for the electronic component, a management method for the electronic component, and a program for achieving the management method.

BACKGROUND

Unexamined Japanese Patent Publication No. 2001-6976 discloses a finite-life electronic component in which at least initial characteristics and a life determination value are displayed on an outer surface of an electronic component body. In Unexamined Japanese Patent Publication No. 2001-6976, the characteristics are measured during use of the finite-life electronic component, and the measurement result is compared with the initial characteristics and the life determination value displayed on the electronic component body to be capable of estimating the life transition time, the surplus life, and whether it can be reused.

SUMMARY

Technical Problem

By the way, it is required to specify production information of the electronic component (information at the time of production) such that when the characteristics are deteriorated during use of the electronic component, it is possible to determine whether there is an abnormality in a production system for producing the electronic component at the time of producing the electronic component. In the finite-life electronic component described in Unexamined Japanese Patent Publication No. 2001-6976, it is possible to determine whether the characteristic of the electronic component is deteriorated by comparing the measurement result with the initial characteristics, but it is not possible to know the production information of the electronic component.

The present disclosure has been made in view of the above problems, and the present disclosure provides an electronic component capable of specifying production information, a production method for the electronic component, a management method for the electronic component, and a program.

Solution to Problem

An electronic component according to an aspect of the present disclosure includes an internal element and a packaging. The production lot for the internal element includes a plurality of subunits. The packaging is provided with an identifier for identifying the plurality of subunits.

A production method for producing an electronic component according to an aspect of the present disclosure is a method for producing an electronic component including an internal element and a packaging. The production method includes a lot step of producing a production lot for the internal element, a separation step of separating the production lot into a plurality of subunits each including one or more pieces, and a subunit step of performing processing individually for the plurality of subunits. The packaging is integral with the internal element. The packaging of the electronic component is provided with an identifier for identifying the plurality of subunits.

A management method for an electronic component according to an aspect of the present disclosure is a method for managing an electronic component including an internal element and a packaging. The packaging is provided with an identifier for identifying a plurality of subunits in a production lot. The management method manages the electronic component for each of the plurality of subunits by managing management information associated with the identifier.

A program according to an aspect of the present disclosure, when executed by a computer, causes the computer to execute the management method.

Advantageous Effect of Invention

According to the present disclosure, it is possible to specify production information of an electronic component.

DESCRIPTION OF EMBODIMENT

(1) Exemplary Embodiment (1.1) Configuration of Electronic Component

Figure 1:
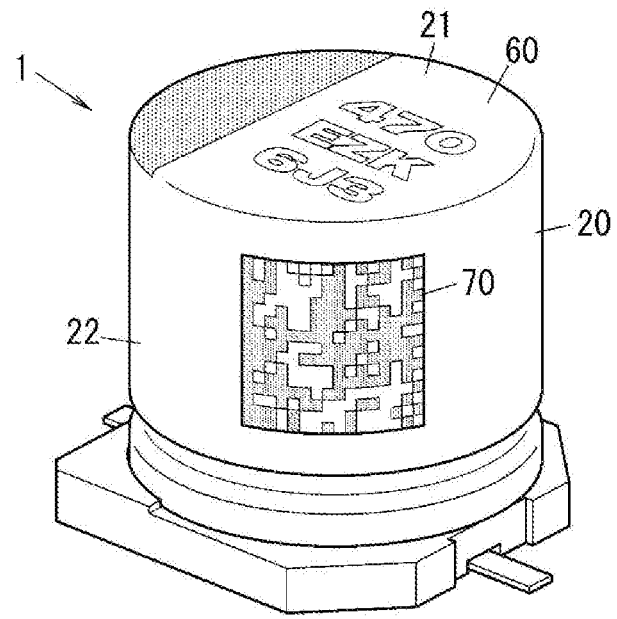
FIG. 1 is a perspective view illustrating an electrolytic capacitor that is an example of an electronic component according to an exemplary embodiment of the present disclosure.
Figure 2:
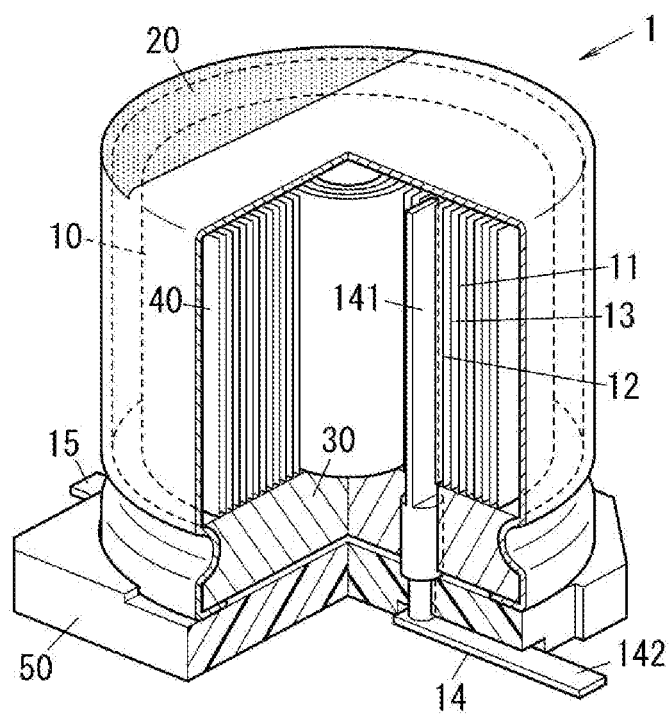
FIG. 2 is a partial cross-sectional view illustrating the above electrolytic capacitor as viewed from an oblique direction.
Figure 3:
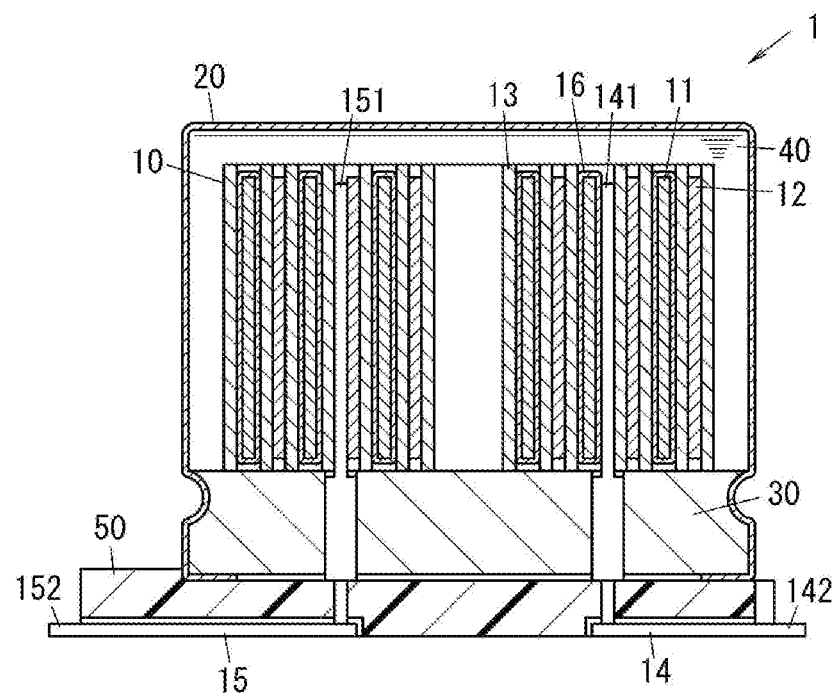
FIG. 3 is a cross-sectional view illustrating the above electrolytic capacitor.

First, electrolytic capacitor 1 as an example of an electronic component according to the present exemplary embodiment will be described with reference to FIGS. 1 to 3. FIG. 1 is a perspective view illustrating electrolytic capacitor 1. FIG. 2 is a partially cross-sectional view illustrating electrolytic capacitor 1 as viewed from an oblique direction. FIG. 3 is a cross-sectional view illustrating electrolytic capacitor 1. Electrolytic capacitor 1 of the present exemplary embodiment is a surface mount type electrolytic capacitor, and is a so-called hybrid type electrolytic capacitor in which an electrolyte is mixed with a conductive polymer and an electrolytic solution.

As shown in FIG. 2, electrolytic capacitor 1 includes capacitor element (internal element) 10, case (packaging) 20, sealing member 30, electrolyte 40, and seat plate 50.

As shown in FIGS. 2 and 3, capacitor element 10 includes anode foil 11, cathode foil 12, separator 13, anode lead terminal 14, and cathode lead terminal 15.

Anode foil 11 includes, for example, a metal foil whose surface is roughened by etching treatment or the like. The metal foil is, for example, an aluminum foil. The material of the metal foil is preferably a valve metal such as aluminum, tantalum, niobium or an alloy of the valve metals. Dielectric film (dielectric layer) 16 is formed on the surface of the metal foil. Dielectric film 16 is formed, for example, by subjecting a metal foil to anodizing treatment. The anodizing treatment is performed, for example, by immersing a metal foil in an anodizing liquid, and applying heat and a voltage as necessary.

Cathode foil 12 includes, for example, a metal foil. The metal foil is, for example, an aluminum foil. The material of the metal foil is preferably a valve metal such as aluminum, tantalum, niobium or an alloy of the valve metals. The metal foil of cathode foil 12 may be subjected to surface roughening treatment and/or anodizing treatment as necessary. The surface of the metal foil of cathode foil 12 may be covered with a carbon coating, a titanium coating, or the like.

Separator 13 is disposed between anode foil 11 and cathode foil 12, and prevents anode foil 11 and cathode foil 12 from being in contact with each other. Separator 13 is made of an insulating material. Separator 13 is not particularly limited, but may be, for example, insulating paper or a nonwoven fabric containing cellulose, polyethylene terephthalate, vinylon, polyamide, glass or the like as a main component.

Anode lead terminal 14 is connected to anode foil 11. The material of anode lead terminal 14 is not particularly limited as long as it is a conductive material. Anode lead terminal 14 integrally includes lead tab 141 and terminal plate 142. Lead tab 141 is connected to anode foil 11 inside case 20. Terminal plate 142 is exposed to the outside of case 20.

Cathode lead terminal 15 is connected to cathode foil 12. The material of cathode lead terminal 15 is not particularly limited as long as it is a conductive material. Cathode lead terminal 15 integrally includes lead tab 151 and terminal plate 152. Lead tab 151 is connected to cathode foil 12 inside case 20. Terminal plate 152 is exposed to the outside of case 20.

Anode foil 11 to which anode lead terminal 14 is connected and cathode foil 12 to which cathode lead terminal 15 is connected are disposed to face each other via separator 13. Then, anode foil 11, cathode foil 12, and separator 13 are rolled up to form capacitor element (winding element) 10 in a cylindrical shape.

Case 20 is made of a material such as aluminum and is formed into a cylindrical shape whose lower face is open. Capacitor element 10 is housed in case 20 such that terminal plate 142 of anode lead terminal 14 and terminal plate 152 of cathode lead terminal 15 are exposed to the outside.

In electrolytic capacitor 1, in case 20, a conductive polymer is disposed between anode foil 11 and cathode foil 12. The material of the conductive polymer may be, for example, polypyrrole, polythiophene, polyaniline, or a derivative of the above substances, and a dopant may be added. The conductive polymer may be attached in a film form to, for example, at least a part of the surface of dielectric film 16 of anode foil 11, the surface of cathode foil 12, and the surface of separator 13. In addition, the electrolytic solution (electrolyte 40) is injected into case 20 after capacitor element 10 is housed.

Sealing member 30 is made of an elastic material such as rubber. Sealing member 30 is attached to case 20 so as to close the opening on the lower face of case 20. Two through holes are formed in sealing member 30.

Seat plate 50 is made of an insulating material. Seat plate 50 is attached to a lower part of case 20. Two through holes are formed in seat plate 50 at positions corresponding to the through holes of sealing member 30. Further, on the bottom surface (lower surface) of seat plate 50, two housing recesses respectively extending outward from the outlets of the through holes are formed.

Anode lead terminal 14 and cathode lead terminal 15 protruding from the inside of case 20 to the outside are passed through the through holes of sealing member 30 and the through holes of seat plate 50, and are bent outward. The outward bent portion of anode lead terminal 14 is housed as terminal plate 142 in one of the two housing recesses of seat plate 50. The outward bent portion of cathode lead terminal 15 is housed as terminal plate 152 in the other of the two housing recesses of seat plate 50.

As shown in FIG. 1, display unit 60 showing the characteristics of electrolytic capacitor 1 is provided on top surface 21 of case 20. Display unit 60 is displayed on top surface 21 of case 20 by printing. Note that the illustration of display unit 60 is omitted in FIG. 2. The display content of display unit 60 includes, for example, a black-painted polarity display showing the polarity (− polarity side) of electrolytic capacitor 1, the value of electrostatic capacitance (numerical value: unit is μF), a rated voltage symbol, a series symbol, a lead-free product mark (black dot), and a lot number (a number indicating a production lot). In electrolytic capacitor 1 of the present exemplary embodiment, the polarity display is attached to a first region (left side in FIG. 1) of top surface 21 of case 20. Further, in a second region (right side in FIG. 1) of top surface 21 of case 20, the electrostatic capacitance is attached to the upper stage, the rated voltage symbol and the series symbol are attached to the middle stage, and the lot number is attached to the lower stage. Of course, the display content, numerical values, or the like of display unit 60 are not limited to those shown in FIG. 1.

Further, as shown in FIG. 1, identifier 70 is attached to case (packaging) 20 in addition to display unit 60. Identifier 70 is attached to case 20 as a display. More specifically, identifier 70 is printed directly on case 20. Further, identifier 70 is provided on side surface 22 of case 20. In the present exemplary embodiment, identifier 70 is a matrix type two-dimensional code.

Here, the production lot of capacitor element (internal element) 10 of electrolytic capacitor 1 includes a plurality of subunits (aggregate), and identifier 70 is an identifier for identifying the plurality of subunits. In other words, the production lot includes a plurality of aggregates (subunits) each including a plurality of electrolytic capacitors 1. Then, identifier 70 specifies a subunit to which electrolytic capacitor 1 belongs among the plurality of subunits included in a production lot, which includes the plurality of electrolytic capacitors 1 as one lot.

The minimum number of electrolytic capacitors 1 included in one subunit is one. A number of electrolytic capacitors 1 included in each of the plurality of subunits is preferably the same as each other, but may be different. For example, each of the plurality of subunits may include one to ten electrolytic capacitors 1. Each of the plurality of subunits may include ten to one hundred electrolytic capacitors 1. Each of the plurality of subunits may include one hundred to one thousand electrolytic capacitors 1. Each of the plurality of subunits may include one thousand to ten thousand electrolytic capacitors 1. Each of the plurality of subunits may include ten thousand or more electrolytic capacitors 1.

In the present exemplary embodiment, the number of electrolytic capacitors 1 included in each of the plurality of subunits is one. In other words, in the present exemplary embodiment, the subunit is a piece. In short, the plurality of electrolytic capacitors 1 included in one production lot are respectively given identifiers 70 different from each other. In particular, in the present exemplary embodiment, all electrolytic capacitors 1 included in all production lots are respectively given identifiers 70 different from each other.

Identifier 70 is attached to case (packaging) 20 of electrolytic capacitor 1 when electrolytic capacitor 1 is produced. Further, at the time of producing electrolytic capacitor 1, the production information at the time of producing each electrolytic capacitor 1 is stored as management information in a database of management device 200 (described later) in association with identifier 70 attached to electrolytic capacitor 1. Thus, by reading identifier 70 of electrolytic capacitor 1 and associating it with the management information in the database, it is possible to individually specify the production information (information at the time of production) of electrolytic capacitor 1.

In one example, the production information includes information indicating the state of a production system for electrolytic capacitor 1, information indicating an inspection result for electrolytic capacitor 1, and the like. The information of the state of the production system includes, for example, information of the driving speed (motor rotation speed) of an apparatus included in the production system, information of the temperature of the apparatus, and the like. The information indicating the inspection result includes, for example, information indicating the rank of evaluation of the inspection result (rank indicating the distinction between excellent, good, and fair). That is, the production information of the present disclosure means information indicating the state of individual products at the time of production, rather than information indicating general specifications of the products.

(1.2) Production Method

Figure 4:
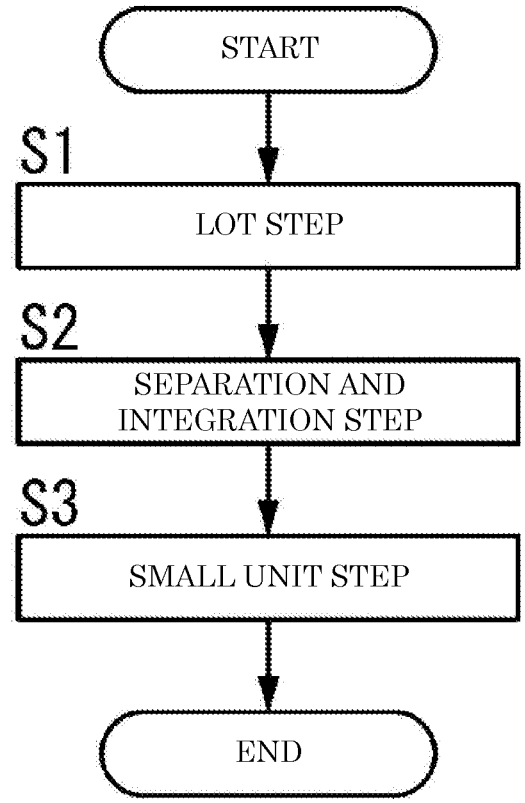
FIG. 4 is a flowchart of a method for producing the electrolytic capacitor that is the example of the electronic component according to the exemplary embodiment of the present disclosure.

Next, a method for producing electrolytic capacitor 1 that is an example of an electronic component according to the present exemplary embodiment will be described with reference to FIGS. 4 to 7. FIG. 4 is a flowchart showing a method for producing electrolytic capacitor 1. The method for producing electrolytic capacitor 1 includes a plurality of steps, and electrolytic capacitor 1 is produced as the plurality of steps is performed in a predetermined order.

As shown in FIG. 4, the method for producing the electronic component (electrolytic capacitor 1) of the present exemplary embodiment includes lot step S1, separation and integration step S2, and subunit step S3. In the present exemplary embodiment, lot step S1, separation and integration step S2, and subunit step S3 are performed in this order.

Lot step S1 is a step of producing a production lot for capacitor element (internal element) 10 of electrolytic capacitor 1 (in lot by lot). Separation and integration step S2 is a step of integrating case (packaging) 20 with capacitor element (internal element) 10 and separating the production lot into a plurality of subunits. Here, the subunit includes one or more pieces. Subunit step S3 is a step of performing processing individually for the plurality of subunits (for each subunit).

In the present exemplary embodiment, in separation and integration step S2, the production lot is separated into a plurality of pieces (individual capacitor elements 10). Then, in subunit step S3, the processing is performed piece by piece (for each capacitor element 10). In other words, in the present exemplary embodiment, subunit step S3 is a piece step in which processing is performed for a piece.

Hereinafter, the method for producing electrolytic capacitor 1 of the present exemplary embodiment will be described in more detail.

Figure 5:
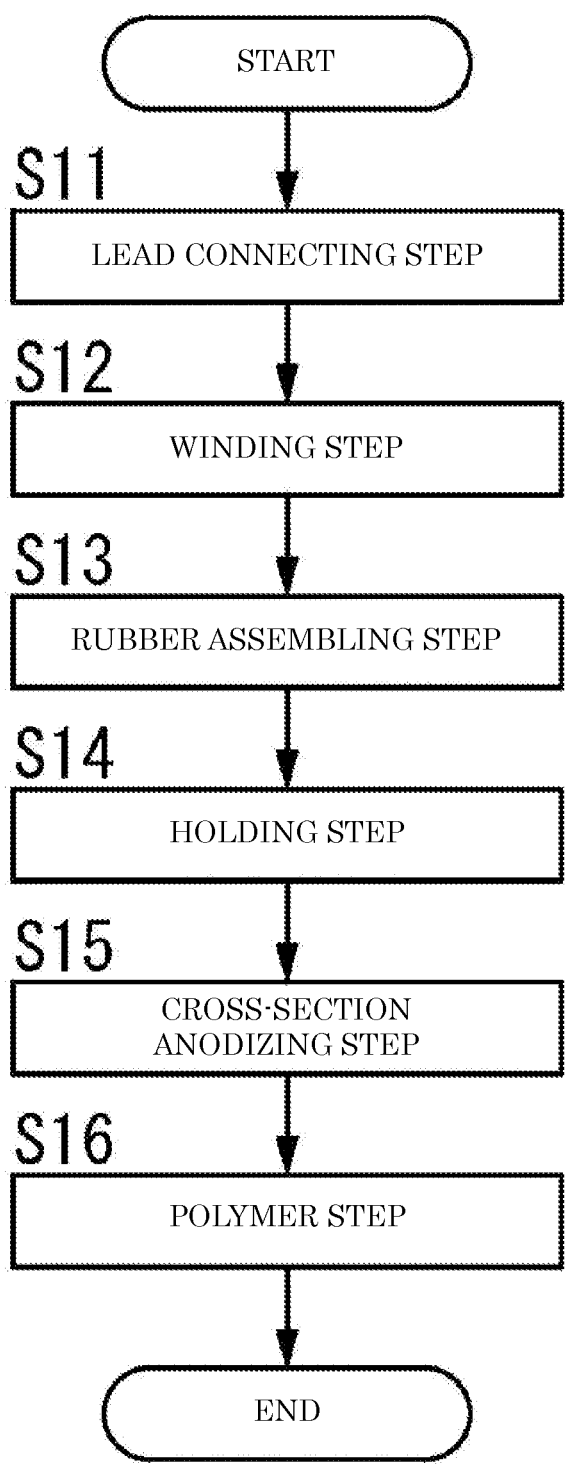
FIG. 5 is a flowchart of a lot step in the above production method.

As shown in FIG. 5, in the method for producing electrolytic capacitor 1 of the present exemplary embodiment, lot step S1 includes lead connecting step S11, winding step S12, rubber assembling step S13, holding step S14, cross-section anodizing step S15, and polymer step S16.

First, before lead connecting step S11, a metal foil (aluminum foil) having a predetermined size is subjected to etching treatment and anodizing treatment, and cut into a desired size, and anode foil 11 is prepared. Further, a metal foil (aluminum foil) having a predetermined size is cut into a desired size, and cathode foil 12 is prepared.

In lead connecting step S11, lead tab 141 of anode lead terminal 14 is connected to anode foil 11 by, for example, swaging or ultrasonic welding, and lead tab 151 of cathode lead terminal 15 is connected to cathode foil 12 by, for example, swaging or ultrasonic welding.

In winding step S12, anode foil 11 and cathode foil 12 are set to face each other via separator 13. Then, anode foil 11, cathode foil 12, and separator 13 are rolled up to manufacture winding elements (capacitor elements 10) in order. Here, the plurality of anode foils 11 and cathode foils 12 are sequentially subjected to winding treatment according to the order in which lead terminals 14, 15 are connected in lead connecting step S11.

In rubber assembling step S13, sealing member 30 is attached to the winding element that has been manufactured in winding step S12. Anode lead terminal 14 and cathode lead terminal 15 of the winding element are inserted into the two through holes of sealing member 30, and sealing member 30 is attached to the winding element. In rubber assembling step S13, sealing member 30 is attached to each of the winding elements, for example, in the order of manufacture in winding step S12. That is, sealing member 30 is attached to each of the winding elements according to the order in which the winding elements are manufactured (in time series).

In holding step S14, the winding element to which sealing member 30 is attached is sequentially held by a band-shaped holder. The holder is, for example, a metal carrier bar. The winding elements are held by the holder so as to line up from a first end to a second end of the holder according to the order in which the winding elements are manufactured (the order in which the winding treatment is performed; the order in which sealing member 30 is attached). Anode lead terminal 14 of the winding element is held (e.g., welded) on the holder such that the height directions of the winding elements are aligned with each other. A plurality of winding elements held by one holder constitutes one production lot. One production lot includes, for example, about 1 to 50,000 winding elements.

In the cross-section anodizing step S15, anode foil 11 of the winding element is subjected to the anodizing treatment. In cross-section anodizing step S15, the anodizing treatment is performed, for example, by immersing the plurality of winding elements held by the holder (carrier bar) in the anodizing liquid in an anodizing tank and by applying a voltage between the holder and the anodizing liquid. By cross-section anodizing step S15, dielectric film 16 is formed on the cutting surface of anode foil 11 formed by cutting, and cracks of dielectric film 16 that can occur in winding step S12 and the like are repaired. In cross-section anodizing step S15, the winding element may be washed and dried as necessary after the anodizing treatment.

In polymer step S16, a conductive polymer is attached to at least a part of the surface of anode foil 11 (dielectric film 16), the surface of cathode foil 12, and the surface of separator 13. In polymer step S16, for example, in a dispersion liquid in which a conductive polymer is dispersed in a solvent, the winding element held by the holder is immersed, the dispersion liquid permeates the entire inside of the winding element, and the winding element is taken out from the dispersion liquid. Then, the winding element impregnated with the dispersion liquid is subjected to heating treatment to volatilize at least a part of the solvent to aggregate the conductive polymer.

Figure 6:
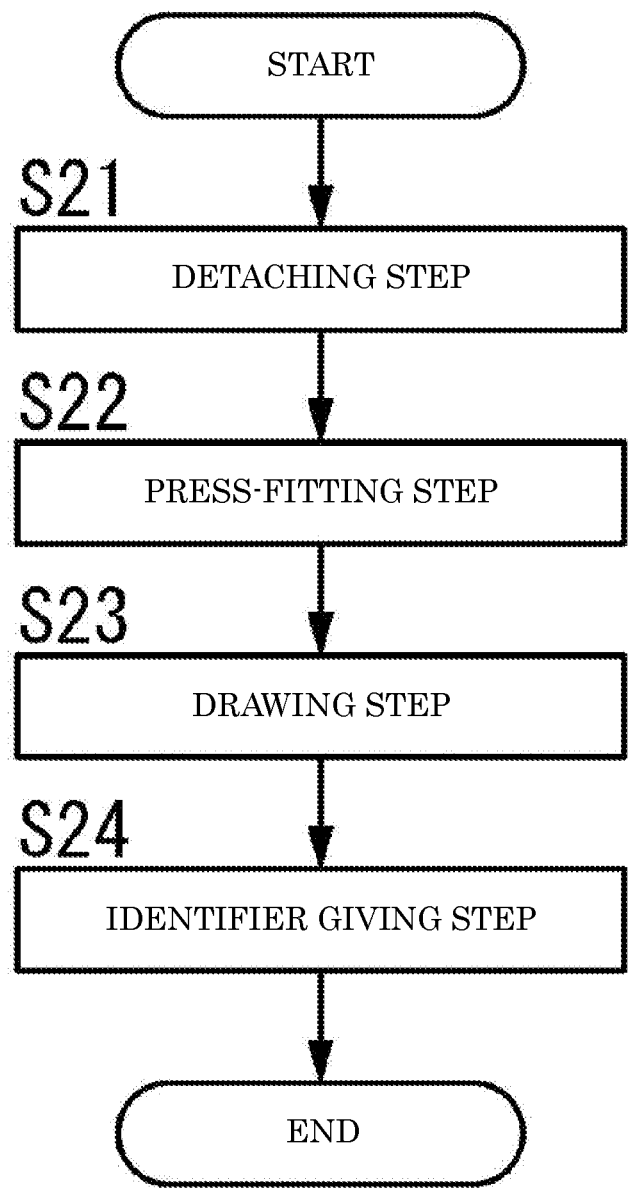
FIG. 6 is a flowchart of a separation and integration step in the above production method.

As shown in FIG. 6, separation and integration step S2 includes detaching step (separation step) S21, press-fitting step S22, drawing step S23, and identifier giving step S24. In detaching step (separation step) S21, a plurality of subunits is sequentially separated from the production lot. Then, identifier 70 is attached to the packaging (case 20) in the order of separation in detaching step (separation step) S21.

In detaching step (separation step) S21, the winding element is detached from the holder. The winding elements are sequentially detached in order from the winding element held on the first end side of the holder. In detaching step S21, for example, anode lead terminal 14 held by the holder is detached from the holder (when anode lead terminal 14 is welded to the holder, for example, anode lead terminal 14 is cut at an appropriate length).

In press-fitting step S22, case 20 is individually attached to the winding element that has been detached from the holder. Case 20 is attached to each of the winding elements in the order of being detached from the holder in detaching step S21. More specifically, the winding element detached from the holder is individually inserted into case (packaging) 20 in which the electrolytic solution (electrolyte 40) has been injected. Here, the diameter of the opening of case 20 is slightly smaller than the outer diameter of sealing member 30, and when the winding element is inserted into case 20, sealing member 30 is press-fitted into case 20. Thus, an assembly in which case 20 is attached to the winding element is manufactured. In press-fitting step S22, case 20 is attached to each of the winding elements in the order in which the winding elements are detached from the holder. That is, in press-fitting step S22, case 20 is attached in the order from the winding element held at the first end of the holder. That is, case 20 is attached to each of the winding elements according to the order in which the winding elements are manufactured (in time series).

In drawing step S23, case 20 is sealed by sealing member 30 by performing drawing treatment for drawing a portion of the side wall of case 20 corresponding to sealing member 30. In drawing step S23, drawing treatment is performed on the winding element in the order in which case 20 is attached in press-fitting step S22. That is, in drawing step S23, for example, the drawing treatment is performed in the order from the winding element (assembly) held at the first end of the holder.

In identifier giving step S24, identifier 70 is sequentially given to case 20 of the assembly held by the holder. In identifier giving step S24, identifier 70 is printed on side surface 22 of case 20 of the assembly by an inkjet printer (first inkjet printer). In identifier giving step S24, for example, identifier 70 is printed in the order of cases 20 of the winding elements (assemblies) that has been subjected to the drawing treatment. That is, the assembly is given identifier 70 according to the order in which the winding elements are manufactured (in time series). Identifier 70 given in identifier giving step S24 is stored in the database of management device 200 in time series together with the time when identifier 70 has been given.

Note that detaching step S21, press-fitting step S22, drawing step S23, and identifier giving step S24 may be continuously performed by a series of apparatuses in separation and integration step S2.

The assembly provided with identifier 70 is housed in a housing box (first housing box). The plurality of assemblies included in one production lot may be housed in one first housing box or may be housed in a plurality of first housing boxes. For example, one first housing box may house several thousands of assemblies. Further, a plurality of assemblies included in the plurality of production lots may be housed in the first housing box.

Figure 7:
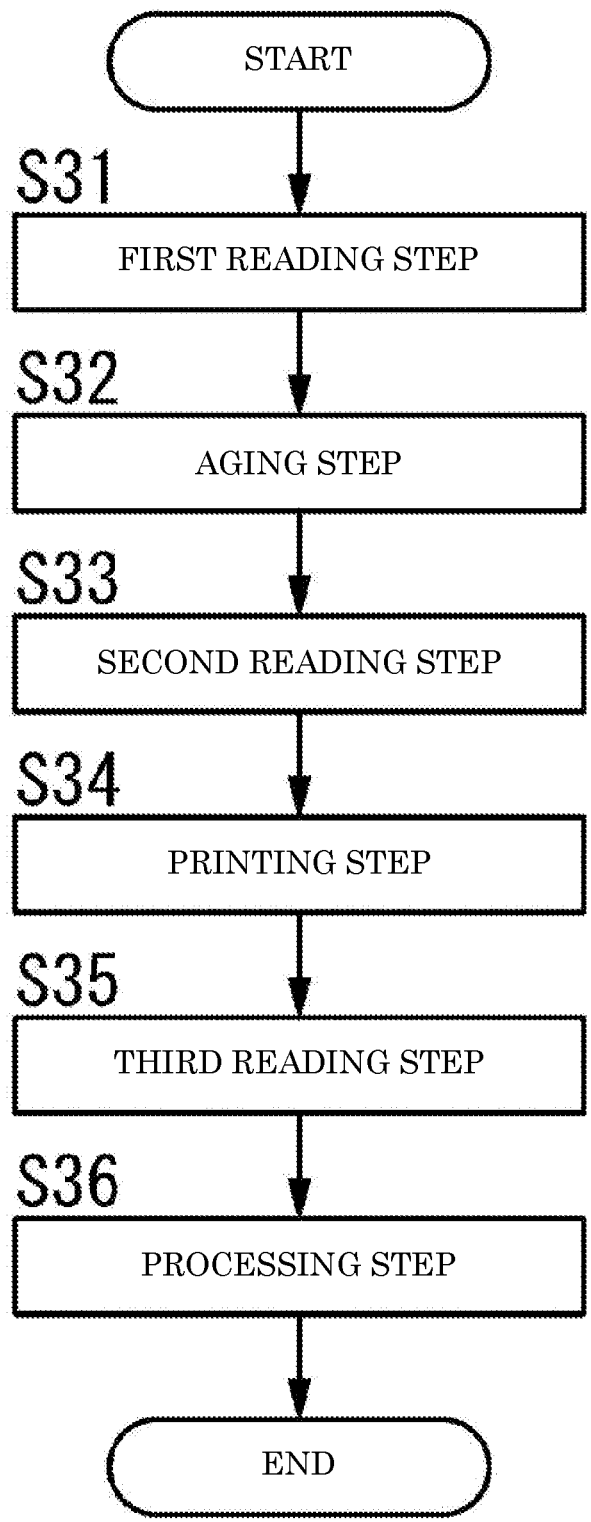
FIG. 7 is a flowchart of a subunit step in the above production method.

As shown in FIG. 7, subunit step (piece step) S3 includes first reading step S31, aging step S32, second reading step S33, printing step S34, third reading step S35, and processing step S36. The two steps, first reading step S31 and aging step S32, are continuously performed as one set. The two steps, second reading step S33 and printing step S34, are continuously performed as one set. The two steps, third reading step S35 and processing step S36, are continuously performed as one set.

In first reading step S31, an arbitrary assembly is picked up from the first housing box, and identifier 70 of the picked up assembly is read. Identifier 70 read in first reading step S31 is stored in the database of management device 200 in time series.

In aging step S32, re-anodizing treatment of dielectric film 16 is performed by applying a voltage between anode lead terminal 14 and cathode lead terminal 15 of the assembly whose identifier 70 has been read in first reading step S31. In aging step S32, the assembly is appropriately heated as necessary. The assembly that has undergone the re-anodizing treatment is housed in a housing box (second housing box). The plurality of assemblies included in one production lot may be housed in one second housing box or may be housed separately in a plurality of second housing boxes. In addition, for example, a plurality of assemblies that has been housed in the common first housing box may be housed in the common second housing box.

In second reading step S33, an arbitrary assembly is picked up from the second housing box, and identifier 70 of the picked up assembly is read. Identifier 70 read in second reading step S33 is stored in the database of management device 200 in time series.

In printing step S34, display unit 60 is printed by an inkjet printer (second inkjet printer) on top surface 21 of case 20 of the assembly whose identifier 70 has been read in second reading step S33. The assembly on which display unit 60 has been printed is housed in a housing box (third housing box). The plurality of assemblies included in one production lot may be housed in one third housing box or may be housed separately in a plurality of third housing boxes. In addition, for example, a plurality of assemblies that has been housed in the common second housing box may be housed in the common third housing box.

In third reading step S35, an arbitrary assembly is picked up from the third housing box, and identifier 70 of the picked up assembly is read. Identifier 70 read in third reading step S35 is stored in the database of management device 200 in time series.

In processing step S36, seat plate 50 is attached to the assembly from which identifier 70 has been read in third reading step S35. In processing step S36, anode lead terminal 14 and cathode lead terminal 15 of the assembly are inserted into the two through holes of seat plate 50, and seat plate 50 is attached to the assembly. Further, after seat plate 50 is attached, anode lead terminal 14 and cathode lead terminal 15 are bent outward, so that the bent portions of the lead terminals are respectively housed as terminal plates 142, 152 in the two housing recesses of seat plate 50.

Electrolytic capacitor 1 of the present exemplary embodiment is manufactured by the procedure as described above.

As can be seen from the above description, in separation and integration step S2, identifier 70 is given according to the order in which the winding elements are manufactured. Then, in each treatment step (aging step S32, printing step S34, processing step S36) in subunit step S3, according to identifier 70 read in a reading step (first, second, third reading steps S31, S33, S35) performed immediately before, the assembly to be treated is known. That is, the order of the assembly treated in the treatment step in subunit step S3 and the order of the winding element separated in separation and integration step S2 (removal step S21) are associated with each other on the basis of identifier 70 read in the reading step.

In short, in the production method for electronic component of the present exemplary embodiment, subunit step S3 includes the picking up step, the reading step (first, second and third reading steps S31, S33, S35), and the treatment step (aging step S32, printing step S34, and processing step S36). The picking up step is a step of picking up, in no particular order, one of the subunits (pieces) from the housing box (first to third housing boxes) in which two or more subunits of the plurality of subunits (pieces) are housed. The reading step is a step of reading identifier 70 of a subunit (piece) that has been picked up from the housing box. The treatment step is a step of performing a predetermined treatment on a subunit (piece) from which identifier 70 has been read. Then, in the production method for the electronic component of the present exemplary embodiment, on the basis of identifier 70 read in the reading step, the order in which the subunit (piece) is treated in the treatment step and the order in which the subunit (piece) is separated in the separation step (detaching step S21) are associated with each other.

(1.3) Production System

Figure 8:
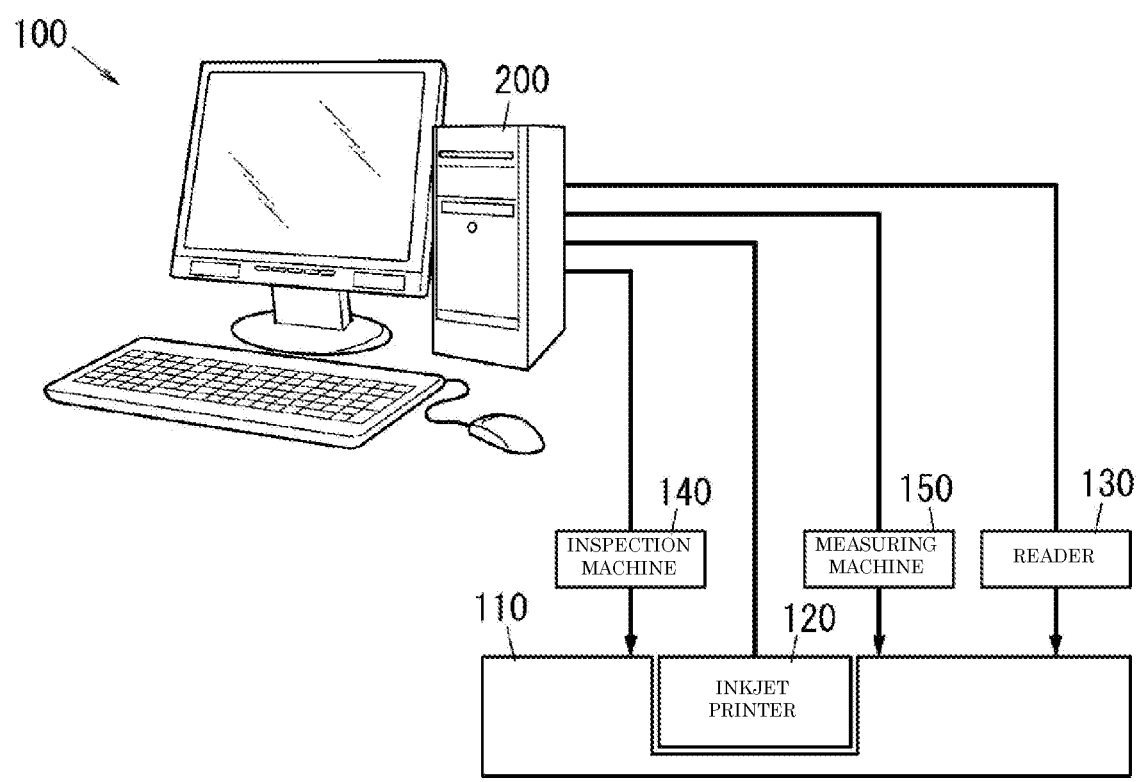
FIG. 8 is a schematic diagram illustrating a system for producing the electrolytic capacitor that is the example of the electronic component according to the exemplary embodiment of the present disclosure.

The above production method is executed by, for example, production system 100 shown in FIG. 8.

Production system 100 of the present exemplary embodiment includes conventional electronic component (electrolytic capacitor) production system (basic production system) 110. The production system of the present exemplary embodiment includes, in addition to basic production system 110, inkjet printer (first inkjet printer) 120, reader 130, inspection machine 140, measuring machine 150, and management device 200.

Basic production system 110 is a conventionally well-known electrolytic capacitor production system. Basic production system 110 performs, among the steps of the production method described in (1.2), lead connecting step S11, winding step S12, rubber assembling step S13, holding step S14, cross-section anodizing step S15, polymer step S16, detaching step S21, press-fitting step S22, drawing step S23, aging step S32, printing step S34, and processing step S36.

Basic production system 110 includes one or a plurality of apparatuses. Basic production system 110 includes, for example, a winding machine that performs lead connecting step S11 and winding step S12, an anodizing tank used in cross-section anodizing step S15, an inkjet printer (second inkjet printer) for printing display unit 60, and the like.

Inkjet printer (first inkjet printer) 120 performs identifier giving step S24 among the steps of the production method described in (1.2).

Reader 130 performs first reading step S31, second reading step S33, and third reading step S35 among the production method described in (1.2). Reader 130 may include, for example, a first reader that performs first reading step S31, a second reader that performs second reading step S33, and a third reader that performs third reading step S35. Alternatively, reader 130 may be one reader that performs first, second, and third reading steps S31, S33, S35.

Inspection machine 140 inspects whether an element member (winding element, assembly) has desired performance in each step of the production method described in (1.2). Inspection machine 140 includes one or a plurality of apparatuses.

For example, in lead connecting step S11, inspection machine 140 inspects whether the dimensions of anode lead terminal 14 and cathode lead terminal 15 after connection are within a desired range. Inspection machine 140 inspects whether anode foil 11 and cathode foil 12 are short-circuited, for example, in winding step S12. Inspection machine 140 inspects whether the height of sealing member 30 is within a desired range, for example, in rubber assembling step S13. Inspection machine 140 inspects, for example, in cross-section anodizing step S15 and/or polymer step S16, whether the convergence current value is within a desired range. Inspection machine 140 inspects, for example, in drawing step S23, whether the drawing shape of case 20 has a desired shape. Inspection machine 140 inspects, for example, in aging step S32, whether a capacitance value, inductive tangent (tan δ), leakage current (LC), and the like are within desired ranges. Inspection machine 140 inspects, for example, in printing step S34, whether top surface 21 of case 20 is provided with display unit 60 having a desired shape. Inspection machine 140 inspects, for example, in processing step S36, whether a capacitance value, inductive tangent (tan δ), equivalent series resistance (ESR), leak current (LC), and the like are within desired ranges. The element member whose inspection result by inspection machine 140 does not have the desired performance is appropriately removed from the manufacturing process.

Measuring machine 150 measures the state of the apparatuses of basic production system 110. Further, measuring machine 150 measures information of the environment in which the apparatuses of basic production system 110 are installed. Measuring machine 150 includes one or a plurality of apparatuses.

Measuring machine 150 measures, for example, the winding speed of the winding element by the winding machine, the temperature of the anodizing tank/the voltage applied to the anodizing tank, and the like. Measuring machine 150 measures, for example, the temperature, humidity, and the like of the environment.

Management device 200 includes, for example, a microcomputer having a processor and a memory. The various functions of management device 200 are achieved by the processor of the microcomputer executing the program recorded in the memory. The program executed by the processor of management device 200 may be recorded in advance in the memory of the microcomputer, may be recorded in a recording medium such as a memory card and provided, or may be provided through an electric communication line.

As described above, management device 200 includes the database that stores the management information. The database may be the same as the above memory, or may be another electrically rewritable recording medium.

Management device 200 is connected to inkjet printer 120, reader 130, inspection machine 140, and measuring machine 150.

Management device 200 acquires identifier 70 (shape of identifier 70) printed on case 20 in identifier giving step S24 from inkjet printer 120. Management device 200 stores identifier 70 acquired from inkjet printer 120 in the database in time series.

Management device 200 acquires identifier 70 (shape of identifier 70) read in first, second and third reading steps S31, S33, S35 from reader 130. Management device 200 stores identifier 70 acquired from reader 130 in the database in time series.

Management device 200 acquires information (measurement value) of the inspection result in each step from inspection machine 140. Management device 200 stores information of the inspection result acquired from inspection machine 140 in the database in time series.

Management device 200 acquires information indicating the state of the apparatus and information of the environment from measuring machine 150. Management device 200 stores information acquired from measuring machine 150 in the database in time series.

That is, management device 200 stores identifier 70 acquired from inkjet printer 120, identifier 70 acquired from reader 130, the information of the inspection result acquired from inspection machine 140, and the information acquired from measuring machine 150 in the database in time series.

(1.4) Management Method

Next, a management method for the electronic component (electrolytic capacitor 1) of the present exemplary embodiment will be described. The management method for the electronic component of the present exemplary embodiment is executed by management device 200.

The management method for the electronic component of the present exemplary embodiment is a management method for the electronic component (electrolytic capacitor 1) having the packaging (case 20) with identifier 70 for identifying the plurality of subunits in the production lot. The management method for the electronic component (electrolytic capacitor 1) manages the electronic component (electrolytic capacitor 1) in subunits by managing the management information associated with identifier 70.

In the present exemplary embodiment, case (packaging) 20 of electrolytic capacitor (electronic component) 1 is provided with identifier 70 for identifying a piece. Then, the management method for the electronic component of the present exemplary embodiment manages the electronic component (electrolytic capacitor 1) for each piece by managing the management information associated with identifier 70.

First, the management method for the electronic component in lot step S1 and separation and integration step S2 will be described.

As can be seen from the description in the section (1.2), in the method for producing the electronic component (electrolytic capacitor 1) of the present exemplary embodiment, the order of a plurality of assemblies (internal elements) to be treated does not change in lot step S1 and separation and integration step S2. Then, the time required for treatment in each step (S11 to S16, S21 to S24) is known, and these steps are continuously performed. Thus, by knowing when identifier 70 has been given in identifier giving step S24, it is possible to know when each of the steps has been performed on the assembly to which identifier 70 has been given. In other words, by knowing the time that identifier 70 has been given to the assembly, it is possible to specify the time of the treatment that each of the apparatuses in production system 100 had performed on this assembly.

In the management method of the present exemplary embodiment, an information of identifier 70 given to each electronic component in identifier giving step S24 is stored in the database of management device 200 in time series together with the time when identifier 70 has been given. This makes it possible to know when each step in lot step S1 and separation and integration step S2 has been performed on the electronic component simply by reading identifier 70 of each electronic component (electrolytic capacitor 1).

Further, in the management method of the present exemplary embodiment, in lot step S1 and separation and integration step S2, the information of the inspection result by inspection machine 140 is stored in the database of management device 200 in time series. The information of the inspection result by inspection machine 140 is finally stored in the database in association with identifier 70 of each electronic component (electrolytic capacitor 1). Thus, after production of the electronic component (electrolytic capacitor 1), it is possible to grasp the inspection result in each step of inspection machine 140 for the electronic component only by reading identifier 70 of each electronic component and referring it with the database. In other words, as the production information (information at the time of production), the information indicating the inspection result of this electronic component can be read from the database.

Further, in the management method of the present exemplary embodiment, in lot step S1 and separation and integration step S2, the information of the state of an apparatus (for example, drive speed, temperature of the apparatus) and the information of environment (for example, temperature, humidity) measured by measuring machine 150 are stored in the database of management device 200 in time series. Thus, after the electronic component (electrolytic capacitor 1) is produced, when identifier 70 of each electronic component is read, the state of the apparatus when this electronic component is produced (the state of the apparatus in production system 100 at the time of producing the electronic component) can be read from the database. In other words, as the production information (information at the time of production), the information indicating the state of the apparatus at the time when the electronic component is produced can be read from the database.

Next, the management method for the electronic component in subunit step S3 will be described.

As described in section (1.2), in the production method for the electronic component of the present exemplary embodiment, subunit step S3 includes the picking up step, the reading step (first, second, and third reading steps S31, S33, S35), and the treatment step (aging step S32, printing step S34, and processing step S36). These three steps are continuously performed as a series of steps.

Then, in the management method for the electronic component of the present exemplary embodiment, in subunit step S3, identifier 70 read in the reading step is stored in the database of management device 200 in time series (together with the time when identifier 70 is read). This makes it possible to grasp when a corresponding treatment step has been performed on the electronic component simply by reading identifier 70 of each electronic component (electrolytic capacitor 1).

Further, in the management method of the present exemplary embodiment, in subunit step S3, the information of the inspection result by inspection machine 140 is stored in the database of management device 200 in time series. The information of the inspection result by inspection machine 140 is finally stored in the database in association with identifier 70 read in the reading step. Thus, after production of the electronic component (electrolytic capacitor 1), it is possible to grasp the inspection result in each step of inspection machine 140 for the electronic component only by reading identifier 70 of each electronic component and referring it with the database. In other words, as the production information (information at the time of production), the information indicating the inspection result of this electronic component can be read from the database.

Further, in the management method of the present exemplary embodiment, in subunit step S3, the information of the state of the apparatus and the information of the environment measured by measuring machine 150 are stored in the database of management device 200 in time series. Thus, after the electronic component (electrolytic capacitor 1) is produced, when identifier 70 of each electronic component is read, the state of the apparatus when this electronic component is produced (the state of the apparatus in production system 100 at the time of producing the electronic component) can be read from the database. In other words, as the production information (information at the time of production), the information indicating the state of the apparatus at the time when the electronic component is produced can be read from the database.

In short, in the management method of the present exemplary embodiment, the management information stored in the database of management device 200 includes information regarding each step of producing the electronic component (electrolytic capacitor 1). The information regarding each step of producing the electronic component includes, for example, at least one of the information of the state of the production apparatus in each step of producing the electronic component, the information of the environment in each step of producing the electronic component, and the information of the inspection result in each step of producing the electronic component.

As described above, in the management method of the present exemplary embodiment, the management information includes information regarding each step of producing the electronic component. Therefore, for example, when a failure occurs in an electronic component when using the electronic component, when identifier 70 of the electronic component is read, the information regarding each step of producing the electronic component can be retrieved from the database (management information) as production information. Thus, for example, it is possible to verify whether there is an abnormality in the production apparatus, the production environment, the inspection result, or the like in each step of producing the electronic component in which a failure has occurred.

Further, in the management method of the present exemplary embodiment, the management information stored in the database of management device 200 includes time series information in production of the electronic component (electrolytic capacitor 1). The time series information in production of the electronic component includes, for example, at least one of time information in which each step is performed in producing the electronic component and information of the order in which a plurality of electronic components is produced.

As described above, in the management method of the present exemplary embodiment, the management information includes the time series information in production of the electronic component. Thus, for example, when a failure occurs in an electronic component when using the electronic component, when identifier 70 of the electronic component is read, the time series information at the time of producing the electronic component can be retrieved from the database (management information) as production information. Thus, for example, before and after the production time of the electronic component in which a failure has occurred, it becomes possible to verify whether there is another electronic component in which a failure has occurred.

(2) Variation Examples

The above-described exemplary embodiment is merely one of various exemplary embodiments of the present disclosure. Further, the above-described exemplary embodiment can be variously modified according to the design and the like as long as the object of the present disclosure can be achieved. Some of variation examples of the above exemplary embodiment are listed below. The above-described exemplary embodiment and the following variation examples can be combined as appropriate.

Functions similar to those of management device 200 and/or the management method in the exemplary embodiment may be embodied in a computer program, a non-transitory recording medium storing the program, or the like. Here, management device 200 or an execution subject of the management method includes a computer system. The computer system mainly includes a processor and a memory as hardware. When the processor executes a program stored in the memory of the computer system, the functions of management device 200 or the execution subject of the management method are achieved. The program may be prerecorded in the memory of the computer system or may be provided through an electric communication line. Further, the program may be provided by being stored in a non-transitory recording medium such as a memory card, an optical disk, a hard disk drive, or the like that can be read by the computer system. The processor of the computer system includes one to a plurality of electronic circuits including a semiconductor integrated circuit (IC) or a large scale integrated circuit (LSI). The plurality of electronic circuits may be integrated in one chip, or may be distributed and provided in a plurality of chips. The plurality of chips may be integrated in one device, or may be distributed and provided in a plurality of devices.

The electronic component is not limited to electrolytic capacitor 1. For example, the electronic component may be an electric double-layer capacitor (EDLC), a ceramic capacitor, or the like. The electronic component may be a solid electrolytic capacitor using a solid electrolyte such as a conductive polymer or an electrolytic capacitor using an electrolytic solution. Further, electrolytic capacitor 1 does not have to include a conductive polymer. The capacitor may be of a so-called sleeve type.

In the production method of the exemplary embodiment, some steps may be appropriately omitted and/or other steps may be appropriately added. For example, cross-section anodizing step S15 and the like may be appropriately omitted.

Further, in the production method of the exemplary embodiment, the order of each step in lot step S1 and each step in the separation and integration step S2 may be different from that in the above exemplary embodiment. For example, rubber assembling step S13 may be performed after press-fitting step S22. Further, identifier giving step S24 may be performed, for example, before drawing step S23. Further, removal step S21 may be performed after press-fitting step S22/drawing step S23 or may be performed after identifier giving step S24.

Alternatively, case 20 may be provided with identifier 70 in advance, and case 20 provided with identifier 70 may be attached to the winding element in press-fitting step S22. That is, press-fitting step S22 and identifier giving step S24 may be performed simultaneously.

The holder is not limited to the carrier bar, but may be an electrically insulating hoop.

The electronic component is not limited to the capacitor, but may be another passive component. For example, the electronic component may be a resistance element, an inductor, or the like.

The packaging of the electronic component is not limited to case 20. The packaging may be, for example, a resin mold.

Identifier 70 is not limited to a two-dimensional code printed on the side surface of the packaging (case 20). Identifier 70 may be, for example, a one-dimensional code (bar code), a symbol, a character, or the like. Alternatively, identifier 70 may be an IC chip, a tag, or the like. Identifier 70 does not have to be attached to the packaging by printing, but may be attached to the packaging by, for example, attaching a seal on which identifier 70 is described to the packaging. Identifier 70 may be attached to a location of the packaging other than the side surface (for example, the top surface or the bottom surface).

Production system 100 may include a plurality of apparatuses (for example, a plurality of winders) for performing the same step. For example, when the management information includes facility information for distinguishing a plurality of apparatuses, it is possible to determine by which apparatus the electronic component has been produced. That is, only by reading identifier 70, it is possible to determine by which of a plurality of apparatuses the electronic component has been produced.

The information that can be referred with the database by reading identifier 70 is not particularly limited, but may include, for example, the date of production, facility information for distinguishing the apparatus, a serial number, and the like.

(3) Aspects

As is clear from the exemplary embodiment and the variation examples described above, the electronic component (electrolytic capacitor 1) of a first aspect includes an internal element (capacitor element 10) and a packaging (case 20). The production lot for an internal element includes a plurality of subunits. The packaging of the electronic component is provided with identifier (70) for identifying the plurality of subunits.

According to the first aspect, since identifier (70) for identifying the subunit is provided on the packaging, the subunit can be specified by reading identifier (70). This makes it possible to specify the production information (information at the time of production) of the electronic component.

In the electronic component according to a second aspect, in the first aspect, identifier (70) is provided on the packaging as a display.

According to the second aspect, identifier (70) can be easily read. Further, for example, identifier (70) can be indirectly read by photographing identifier (70) and reading the identifier shown in the photographed image.

In the electronic component according to a third aspect, in the second aspect, identifier (70) is directly printed on the packaging.

According to the third aspect, identifier (70) can be easily provided.

In the electronic component according to a fourth aspect, in the second or third aspect, identifier (70) is provided on side surface (22) of the packaging.

According to the fourth aspect, identifier (70) can be provided using side surface (22) of the packaging (case 20).

In the electronic component according to a fifth aspect, in any one of the second to fourth aspects, identifier (70) is a one-dimensional code or a two-dimensional code.

According to the fifth aspect, it is possible to indicate more information by identifier (70) than in the case of symbols, characters, and the like.

In the electronic component according to a sixth aspect, in any one of the first to fifth aspects, each of the plurality of subunits is a piece.

According to the sixth aspect, the piece can be specified by identifier (70), and the production information for each electronic component can be specified.

The production method for producing the electronic component (electrolytic capacitor 1) of a seventh aspect is a method for producing an electronic component including an internal element (capacitor element 10) and a packaging (case 20). The production method for electronic component includes lot step (S1) of producing a production lot for the internal element, a separation step (detaching step S21) of separating the production lot into a plurality of subunits each including one or more pieces, and subunit step (S3) of performing processing individually for the plurality of subunits. The packaging is integral with the internal element. The packaging of the electronic component is provided with identifier (70) for identifying the plurality of subunits.

According to the seventh aspect, it is possible to specify production information of an electronic component.

In the production method for electronic component according to an eighth aspect, in the seventh aspect, the separation step (detaching step S21) includes one or more steps of sequentially separating a plurality of subunits from the production lot. In the separation step (detaching step S21), identifier (70) is provided on the packaging in each of the one or more steps of sequentially separating.

According to the eighth aspect, according to the order in which the production lot is separated into subunits, since identifier (70) is attached to the packaging, when identifier (70) is attached according to the production order of the subunits, it becomes possible to specify time series information at the time of production of a subunit.

In the production method for electronic component according to a ninth aspect, in the eighth aspect, subunit step (S3) includes a picking up step, a reading step, and a treatment step. The picking up step is a step of picking up, in no particular order, one of the plurality of subunits from the housing box in which two or more of the plurality of subunits are housed. The reading step is a step of reading identifier (70) of the one of the plurality of subunits that has been picked up from the housing box. The treatment step is a step of performing a predetermined treatment on the one of the plurality of subunits from which identifier (70) has been read. On the basis of identifier (70) read in the reading step, the order in which the one of the plurality of subunits is treated in the treatment step and the order in which the one of the plurality of subunits is separated in the separation step (detaching step S21) are associated with each other.

According to the ninth aspect, even when a plurality of subunits is once housed in the housing box, it is possible to specify time series information at the time of production of the subunits.

In the production method for electronic component according to a tenth aspect, in any one of the seventh to ninth aspects, subunit step (S3) is a piece step of performing the treatment for a piece.

According to the tenth aspect, the piece can be identified by identifier (70), and the production information for each electronic component can be specified.

The management method for an electronic component of an eleventh aspect is a method for managing an electronic component (electrolytic capacitor 1) including an internal element (capacitor element 10) and a packaging (case 20). The packaging is provided with identifier (70) for identifying a plurality of subunits in a production lot. The electronic component is managed for each of the plurality of subunits by managing management information associated with identifier (70).

According to the eleventh aspect, it is possible to specify the production information of the electronic component on the basis of the management information.

In the management method for electronic component according to a twelfth aspect, in the eleventh aspect, the management information includes information regarding each step in producing the electronic component.

According to the twelfth aspect, it is possible to specify the information regarding each step at the time of producing the electronic component on the basis of the management information.

In the management method for an electronic component according to a thirteenth aspect, in the eleventh or twelfth aspect, the management information includes time series information in the producing of the electronic component.

According to the thirteenth aspect, it is possible to specify the time series information in production of the electronic component.

The program according to a fourteenth aspect is a program that, when executed by a computer, causes the computer to execute the management method of any of the eleventh to thirteenth aspects.

According to the fourteenth aspect, it is possible to specify the production information of the electronic component on the basis of the management information.

The configurations according to the second to sixth aspects are not essential configurations of the electronic component, but can be omitted as appropriate. The configurations according to the eighth to tenth aspects are not essential configurations of the production method for an electronic component, but can be omitted as appropriate. The configurations according to the twelfth to fourteenth aspects are not essential configurations of the management method for an electronic component, but can be omitted as appropriate.

The invention claimed is:

1. A production method for producing an electronic component including an internal element and a packaging, the production method comprising:
    a lot step of producing a production lot of a plurality of internal elements including the internal element;
    a separation step of separating the plurality of internal elements in the production lot into a plurality of subunits each including one or more pieces;
    an integration step of integrating the packaging and each of the plurality of subunits and providing an identifier to the packaging to obtain an integrated component
    a subunit step of performing processing or treatment to the integrated component for each of the plurality of subunits, wherein:
    the integration step includes storing a first production information to a database of a management device in association with the identifier, the first production information being a production information related to processing or treatment performed, in the lot step, to the internal element corresponding to each of the plurality of subunits, and
    the subunit step includes storing a second production information to the database of the management device in association with the identifier, the second production information being a production information related to processing or treatment performed, in the subunit step, to the integrated component.

2. The production method for an electronic component according to claim 1, wherein:
    the separation step includes steps of sequentially separating the plurality of subunits from the production lot, and
    in the integration step, the identifier is provided on the packaging in order of the steps of sequentially separating in the separation step.

3. The production method for an electronic component according to claim 2, wherein:
    the subunit step includes:
        a picking up step of picking up, in no particular order, one of a plurality of integrated components including the integrated component from a housing box in which two or more of the plurality of integrated components are housed,
        a reading step of reading the identifier of the one of the plurality of integrated components that has been picked up from the housing box, and
        a treatment step of performing a predetermined treatment on the one of the plurality of integrated components from which the identifier has been read, and
    on a basis of the identifier read in the reading step, an order of processing or treatment in the treatment step and an order of separating in the separation step with respect to the one of the plurality of integrated components are associated with each other.

4. The production method for an electronic component according to claim 1, wherein the subunit step is a piece step of performing treatment for a piece.

5. The production method for an electronic component according to claim 1, wherein:
    the lot step includes a step of producing the plurality of internal elements held by a holder so that the plurality of internal elements are aligned in the holder, and
    an alignment order of the plurality of internal elements held by the holder is specified by the first production information associated with the identifier.

6. The production method for an electronic component according to claim 1, wherein:
    the first production information includes a time series information related to processing or treatment performed, in the lot step, to the internal element corresponding to each of the plurality of subunits until the each of the plurality of subunits is obtained, and the first production information related to each of the plurality of subunits is associated with the identifier by using a time when the identifier is provided to the packaging.

7. The production method for an electronic component according to claim 1, wherein:
the second production information includes a time series information related to processing or treatment performed, in the subunit step, to the integrated component,
the subunit step includes a reading step of reading the identifier of the integrated component, and
the second production information related to the integrated component is associated with the identifier by using a time when the identifier is read.

* * * * *